US006226582B1

(12) United States Patent
Adsett et al.

(10) Patent No.: US 6,226,582 B1
(45) **Date of Patent: *May 1, 2001**

(54) INTEGRATED CONTROL FOR ELECTRIC LIFT TRUCKS

(75) Inventors: Robert T. Adsett; Pierre C. Gadbois, both of Waterloo (CA)

(73) Assignee: SRE Controls, Inc., Waterloo (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,079

(22) Filed: Jul. 21, 1998

Related U.S. Application Data

(60) Provisional application No. 60/053,327, filed on Jul. 21, 1997.

(51) Int. Cl.[7] ............................ G06F 17/00; G06F 19/00; G06G 7/00

(52) U.S. Cl. ................................ 701/50; 701/24; 701/22; 180/68.5; 180/53.2; 180/315; 180/321; 180/324; 180/333; 318/67; 318/700; 318/799; 318/802; 37/397; 37/379; 323/222; 323/326; 414/685; 414/694

(58) Field of Search .................................... 414/694, 685; 180/68.5, 333, 65.8, 286, 315, 321, 324, 53.2; 37/397, 379; 318/67, 799, 700, 802; 323/222, 326; 363/21; 701/50, 22, 24

(56) References Cited

U.S. PATENT DOCUMENTS

| | | | | |
|---|---|---|---|---|
| 2,564,002 | | 8/1951 | Gibson | 180/13 |
| 3,991,846 | * | 11/1976 | Chichester et al. | 180/132 |
| 4,102,132 | | 7/1978 | Palmer | 60/433 |
| 4,449,365 | | 5/1984 | Hancock | 60/422 |
| 4,700,802 | * | 10/1987 | Fought | 180/324 |
| 4,755,100 | | 7/1988 | Schultz et al. | 414/635 |
| 5,002,454 | | 3/1991 | Hadank et al. | 414/695.5 |
| 5,110,253 | * | 5/1992 | Ernst et al. | 414/694 |
| 5,331,258 | | 7/1994 | Lankin et al. | 318/139 |
| 5,332,954 | | 7/1994 | Lankin | 318/139 |
| 5,520,258 | * | 5/1996 | Kemshall | 180/68.5 |
| 5,638,387 | * | 6/1997 | Palleggi et al. | 318/67 |
| 5,822,892 | * | 10/1998 | Ohbatake et al. | 37/397 |
| 5,924,516 | * | 6/1999 | Sagaser et al. | 180/333 |
| 6,008,630 | * | 12/1999 | Prasad | 323/222 |
| 6,015,019 | * | 1/2000 | Grimes et al. | 180/53.2 |

FOREIGN PATENT DOCUMENTS

| | | | |
|---|---|---|---|
| 2 343 297 | 3/1974 | (DE) | B66F/9/06 |
| 295 02 639 U | 5/1995 | (DE) | B66F/9/06 |
| 0 664 273 | 7/1995 | (EP) | B66F/9/24 |
| 1 385 099 | 2/1975 | (GB) | F15B/11/05 |
| WO 95/18995 | 7/1995 | (WO) | G05G/9/047 |

* cited by examiner

*Primary Examiner*—William A. Cuchlinski, Jr.
*Assistant Examiner*—Ronnie Mancho
(74) *Attorney, Agent, or Firm*—Pearne & Gordon LLP

(57) ABSTRACT

A control system for an electric lift truck that controls a traction motor and a hydraulic pump motor is disclosed. The speed of rotation of both motors is controlled by a pulse width modulated current supplied from a battery source by the controller in direct response to a demand communicated to the controller through an interface manipulated by an operator. A pump driven by the pump motor supplies pressurized hydraulic fluid to a lift mechanism and a power assisted steering unit. A joystick with function switches mounted thereto is provided so that the operator steers with one hand while controlling truck propulsion and all functions of the lift mechanism with the other hand. The direct control of the pump motor speed enables a fully proportional control of the hydraulic system. The control system is a compact structure that requires minimal cabling and ensures that the hydraulic system operates with energy efficiency and minimal wear.

34 Claims, 5 Drawing Sheets

INTEGRATED CONTROL FOR ELECTRIC LIFT TRUCKS

This application claims benefit to U.S. provisional application Ser. No. 60/053,327, filed Jul. 21, 1997.

FIELD OF THE INVENTION

This invention relates generally to lift trucks that are powered by electric motors and, in particular, to a novel electronic control unit for controlling both an electric drive motor and an electric hydraulic pump motor for hydraulic functions of the electric lift truck.

BACKGROUND OF THE INVENTION

In prior art regarding electric lift trucks, at least two controllers are used, one controller for the electric drive motor which may be a series wound motor or a separately excited motor, for example, and another controller for the hydraulic pump unit. The two controllers require double cabling and a duplication of processors and other components.

In prior art electric lift trucks, it is also common practice to run the hydraulic pump at or near full capacity at all times. Oil is pumped into a hydraulic circuit or a pressure tank and a pressure relief valve bleeds off excess fluid pressure into a reservoir where it is picked up by the pump and re-pressurized in a continuous cycle. As pressurized fluid is required for lift functions, it is delivered by the pump to the working devices and then bled back into the reservoir. While this arrangement works well, it is very energy inefficient.

Another feature of prior art electric lift trucks is that hydraulically-assisted power steering in such trucks is generally provided with a separate power steering pump motor which uses a common reservoir with the lift motor but is otherwise a separate hydraulic circuit.

In most prior art lift trucks, lift functions are controlled by a bank of hydraulic valves which are manually operated to provide such lift functions as fork tilt, horizontal reach of the forks toward or away from the front of the truck, left or right side-shift of the fork rack, and raising or lowering of the forks. Thus at least four hydraulic valves may be provided for lift fork control. Each hydraulic valve is generally actuated by a manually operated lever.

In order to improve the control system of an electric lift truck, efforts have been made in respect of many of the features discussed above. U.S. Pat. No. 5,481,875, entitled APPARATUS FOR CHANGING AND CONTROLLING VOLUME OF HYDRAULIC OIL IN HYDRAULIC EXCAVATOR, which issued to Takamura et al. on Jan. 9, 1996 is an example. This patent discloses a hydraulic oil volume change-over control apparatus for a hydraulic excavator which subjects a hydraulic pump to load sensing control so as to provide an optimum volume of hydraulic oil while an engine for driving the hydraulic pump is operated at a rotational speed at which the fuel consumption of the engine is minimal, by setting a low power mode during breaker work or the like which is performed with a smaller volume of hydraulic oil than that needed during normal excavating work. The control apparatus comprises a variable displacement hydraulic pump, an engine for driving the hydraulic pump, an actuator driven by the hydraulic pump, an actuator control valve disposed in pipe lines between the hydraulic pump and the actuator, a load sensing control device for the hydraulic pump, and a controller for computing a control signal for operating the engine at a minimum fuel consumption rate under a predetermined power designated by the working mode changeover device, so as to deliver a control signal to the load sensing control device and a governor drive device for the engine. The controller can receive signals from a volume sensor for the hydraulic pump, an engine rotational speed sensor for the engine, a hydraulic pressure sensor for the actuator, and the load sensing control device.

Another example is U.S. Pat. No. 4,449,365 entitled LIFT, TILT AND STEERING CONTROL FOR A LIFT TRUCK, which issued to Hancock on May 22, 1984. This patent discloses a lift truck hydraulic control system designed to conserve energy including a pair of separately controlled pumps (21, 22). One pump (21) supplies pressure fluid to a valve (12) for a steering cylinder (11) by way of a high priority port (34) of a priority valve (32) with a low priority flow to parallel connected lift and tilt valves (19, 18) which control operation of the lift cylinder (15) and tilt cylinders (16, 17), respectively. The capacity of pump (21) is sufficient to provide proper, effective operation of the steering and tilt functions but is not adequate to provide hydraulic fluid flow for high- speed extension of the lift cylinder (15). The other pump (22) is operated to supply additional pressure fluid flow for high-speed lift only when the lift valve (19) is shifted to a raise position. In one embodiment, low speed lift is obtained by using the output of the first pump (21) and a high-speed lift is obtained by selectively adding the output of the second pump 22. This is achieved by operating the second pump (22) only when the lift valve (19) is placed in an extreme raise position. In another embodiment, both pumps (21, 22) are operated "on demand", thereby further conserving energy.

Also directed to a control system for power steering, U.S. Pat. No. 3,991,846, which issued on Nov. 16, 1976 to Chichester et al. is entitled POWER STEERING SYSTEM and discloses a power steering system for electric vehicles. The system uses an electric drive motor for the supply pump of a power steering system controlled by a motor control which is in turn controlled by the steering demand of the operator. The motor and pump are operated only during steering operations and only at the power level required for any steering demand.

An example of improvements in vehicle control is taught in U.S. Pat. No. 5,002,454, entitled INTUITIVE JOYSTICK CONTROL FOR A WORK IMPLEMENT, which issued to Hadank et al. on Mar. 26, 1991. This patent discloses a joystick control system for a work implement of earthmoving or material handling vehicles which includes two multi-axis joysticks that provide the operator with an intuitive control interface to the vehicle in an effort to improve the manipulation of the implement with conventional control handles and pedals that do not intuitively correspond to the movement of the implement. The control system also provides a coordinated control system for spatial placement of the end effector of the work implement.

The examples above illustrate the scope of effort that has been invested in this field. However, the prior art does not teach an integrated controller for both traction and hydraulic function control of an electric lift truck. Furthermore, the prior art does not teach using a single joystick as the only interface to control the propulsion of the truck as well as all hydraulic functions of the lift mechanism. Consequently, several significant problems are left un-addressed by the teachings of the prior art. First, modern lift trucks, especially electrically powered lift trucks, are designed to be compact and space for drive and control components is minimal. There therefore exists a need for a compact controller that can control both drive and hydraulic functions so that space required for electrical cabling and controller footprints are reduced. Secondly, energy conservation has become a significant issue. There therefore exists a need for a new hydraulic circuit and pump control that is capable of supplying adequate pressurized fluid for all hydraulic functions, including power steering, with a single pump. Third, the prior art lift trucks with power assisted steering designed to conserve energy shut down the hydraulic pump(s) when there is no demand for pressurized fluid. Consequently, the pump motors are subjected to frequent starts under load. This causes wear on the motor and shortens service life. There therefore exists a need for an efficient hydraulic pump control that minimizes wear and extends pump service life.

SUMMARY OF THE INVENTION

It is therefore an object of the present invention to provide an integrated drive and hydraulic control system for an electric lift truck.

Another object of the invention is to provide a control system for an electric lift truck having two electric motors, one for truck propulsion and the other for a hydraulic pump, which system controls both of the motors simultaneously.

Yet another object of the invention is to provide an energy efficient hydraulic system for an electric lift truck.

Yet another object of the invention is to provide a hydraulic system for an electric lift truck which requires only one pump motor to supply pressurized fluid for all hydraulic functions including power steering.

A further object of the invention is to provide an interface for an operator to control with one hand all functions of an electric lift truck except steering.

In accordance with a first aspect of this invention, a control system for an electric lift truck is provided. The electric lift truck includes a first electric motor for truck propulsion and a second electric motor connected to a hydraulic pump for supplying pressurized hydraulic fluid through a hydraulic circuit to a hydraulic lift mechanism. The control system comprises:

- an interface for an operator to control the propulsion of the electric lift truck and a plurality of functions of the hydraulic lift mechanism, the interface generating a plurality of control signals in response to inputs through the interface by the operator;
- a controller connected to the interface and the first and second electric motors for receiving the control signals from the interface, and controlling a speed and a direction of revolution of the first electric motor, and a speed of revolution of the second electric motor.

Preferably, the controller is a pulse-width modulation controller and the first and second electric motors are DC or AC motors.

The hydraulic circuit of the control system may further comprise a power assisted steering system to which a hydraulic fluid is supplied with high priority from the pump.

Preferably, the control system further comprises an on-demand pressure switch that is connected to the hydraulic circuit between the hydraulic pump and the power assisted steering system so that the switch is triggered by a pressure rise in a supply of hydraulic fluid for the power assisted steering system. The on-demand pressure switch generates an electric signal to prompt the controller to change a speed of revolution of the second electric motor from a first speed to a second speed which is faster than the first speed.

The controller of the control system preferably executes an algorithm for measuring electric signals from the on-demand pressure switch and the interface respectively, and controls the speed of revolution of the second electric motor in response to the signals so that the hydraulic pump meets a demand of both of the power assisted steering system and the hydraulic lift mechanism.

The controller also preferably controls the second electric motor to operate at an idle when no hydraulic fluid pressure is required for the hydraulic functions of the lift mechanism or the power assisted steering system. If the lift truck does not have power-assisted steering, the pump motor is preferably turned off when there is no demand for pressurized hydraulic fluid.

In accordance with a second aspect of the present invention an electronically controlled hydraulic system for a lift truck having a power assisted steering and a hydraulic lift mechanism is provided. The electronically controlled hydraulic system comprises:

- a pump driven by an electric motor for supplying pressurized hydraulic fluid to a torque generator for the power assisted steering and to the hydraulic lift mechanism;
- a hydraulic circuit including a tank for the hydraulic fluid and a priority valve, the hydraulic circuit being in fluid communication with the pump and torque generator as well as the hydraulic lift mechanism, the priority valve distributing a fluid flow to the torque generator with a high priority so that a required supply of the pressurized fluid to the torque generator is ensured;
- an on-demand pressure switch connected to the hydraulic circuit, the on-demand pressure switch generating an electric signal when the torque generator causes a rise in the hydraulic fluid pressure;
- an interface for an operator to control a plurality of functions of the hydraulic lift mechanism, the interface generating a plurality of control signals in response to manipulation of the interface by the operator;
- a controller for controlling the motor, the controller being connected to the on-demand pressure switch and the interface so that when the controller receives a signal from the on-demand pressure switch or a signal from the interface, the controller changes a speed of revolution of the motor, but the controller operates the motor at an idle speed when the power assisted steering and the lift mechanism are each in a standby state and no pressurized hydraulic fluid is required.

Preferably, the controller is pulse-width modulation controller and the motor is a DC or AC motor.

The hydraulic circuit of the system may comprise:

- a lift cylinder for lifting and lowering the lift mechanism;
- a tilt cylinder for tilting the lift mechanism;
- a reach cylinder for moving the lift mechanism toward and away from a front of the lift truck;
- a side-shift cylinder for moving the lift mechanism left and right with respect to the front of the lift truck; and
- a solenoid-valve block for selectively directing the pressurized fluid from the pump to a one of the lift, tilt, reach and side-shift cylinders.

The hydraulic circuit of the system preferably further comprises a proportional valve and a solenoid check valve connected in series between the lift cylinder and the tank, the solenoid check valve and proportional valve being controlled by the controller so that a lowering speed of the lift mechanism is controlled.

In accordance with a third aspect of the present invention, an operator interface for controlling an electric lift truck is provided, the electric lift truck including a first electric motor for truck propulsion and a second electric motor connected in driving relation to a hydraulic pump. The operator interface comprising a joystick enabled to generate signals simultaneously representative of movement with respect to a first and second axis; an electric controller for controlling a speed and direction of revolution of the first electric motor and a speed of revolution of the second electric motor respectively, the controller receiving the signals generated by the joystick when the operator manipulates the joystick to generate signals that represent a movement with respect to the first and second axis, and controls a speed and a direction of revolution of the first electric motor in response to signals representing movement with respect to the first axis and controls a speed of revolution of the second electric motor in response to signals representing movement with respect to the second axis.

In one embodiment, the joystick has a top end that is tiltable by an operator of the lift truck simultaneously along a first and second axes that are at right angles to each other. In another embodiment, the joystick is tiltable by an operator along a first axis to control the propulsion of the lift truck and a thumb wheel is mounted to a top end of the joystick, the thumb wheel being rotatable about an axis to control the lift functions.

Preferably, a direction of revolution of the first electric motor is changed when the joystick is tilted along the first axis and past a vertical orientation and a direction of a movement of the lift mechanism is changed when the joystick is moved along the second axis and past the vertical orientation.

The joystick preferably further comprises a plurality of buttons for controlling a plurality of functions of the hydraulic lift mechanism, in addition to a default function, the buttons being mapped in the controller to control desired lift functions.

In a preferred embodiment, the movement of the joystick along the second axis selects a lowering function and causes the electric controller to actuate a solenoid check valve and a proportional valve in a hydraulic circuit to control a speed at which the hydraulic lift mechanism is lowered when the lowering option is selected.

BRIEF DESCRIPTION OF THE DRAWINGS

The invention will now be explained by way of example only and with reference to the accompanying drawings in which.

DETAILED DESCRIPTION OF THE PREFERRED EMBODIMENT

Figure 1:
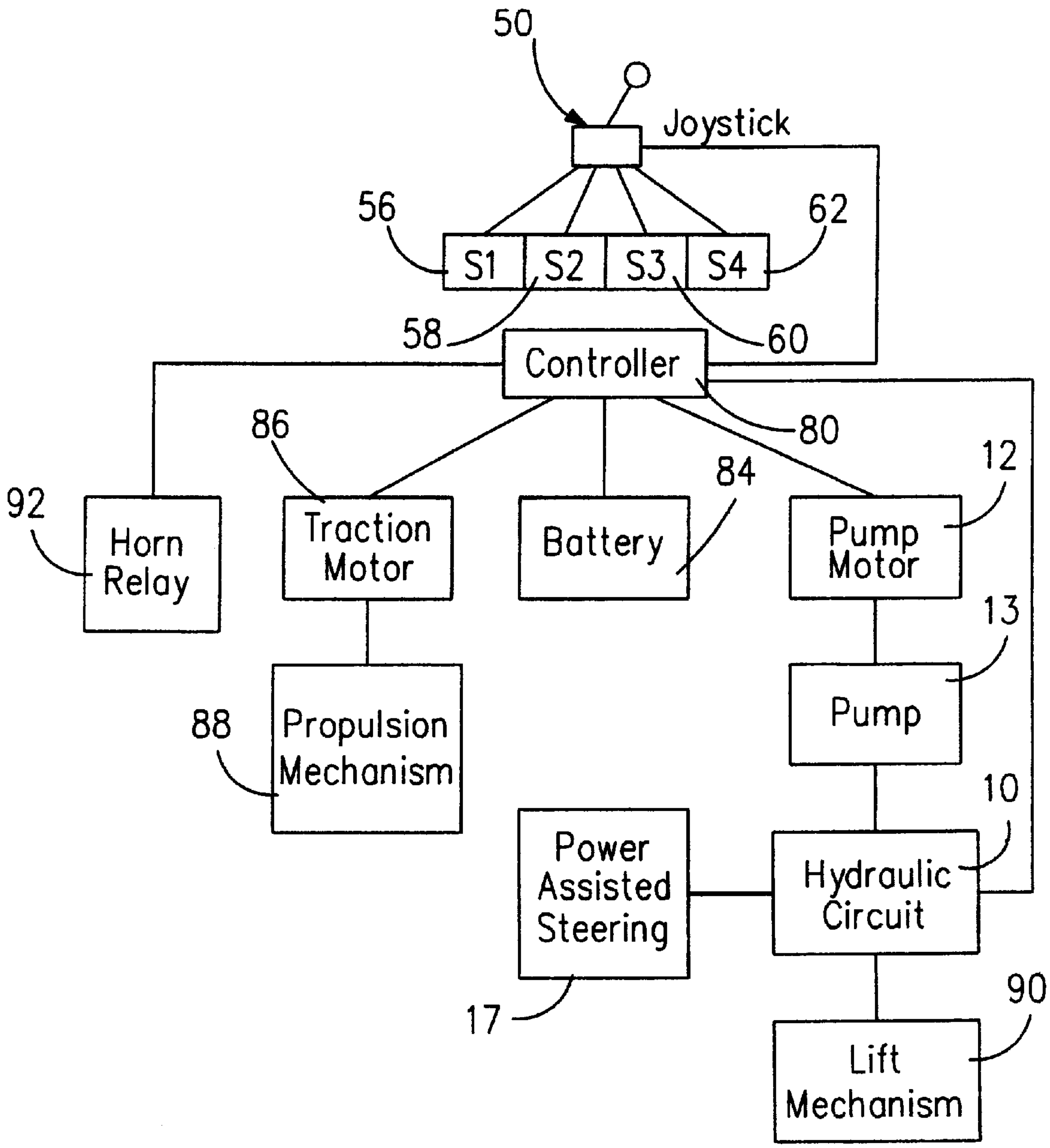
FIG. 1 is a schematic diagram of a control system according to a preferred embodiment of the present invention, in which a single controller is used for controlling both a traction motor and a hydraulic pump motor of an electric lift truck.

A control system for drive and hydraulic functions of an electric lift truck is provided. The control system and the controlled lift truck functions are illustrated in FIG. 1. This embodiment of the control system comprises a single controller 80 directly controlling a traction motor 86 which drives a propulsion mechanism 88 to move the electric lift truck forwards or backwards, and a pump motor 12 which is connected to an hydraulic pump 13. The controller 80 is a pulse width modulation (PWM) controller and the traction motor 86 and pump motor 12 are typically series wound DC or AC motors, although separately excited motors, permanent magnet motors or reluctance motors may also be used. A battery 84 supplies electric power to both the traction motor 86 and pump motor 12 through the controller 80 which modulates the width and interval of a pulsed DC or AC current and therefore controls the speed of the two motors, respectively. The direction of revolution of the traction motor 86 is also controlled by the controller 80. PWM controllers are well known in the art and are described for example in U.S. Pat. Nos. 5,332,954 and 5,331,258 which respectively issued to the applicant on Jul. 19, 1994 and Jul. 26, 1994.

The pump 13 driven by the pump motor 12 is connected to a hydraulic circuit 10 through which the pump 13 supplies pressurized hydraulic fluid to a torque generator (not shown) that provides power assisted steering 17 for the lift truck. The pump also supplies pressurized hydraulic fluid to a lift mechanism 90 of the truck, such as a lift fork having functions of lifting, lowering, tilting, reaching and side-shift of the forks.

A joystick 50 provides an operator with an interface to the controller 80. A preferred embodiment of the joystick includes four switches 56, 58, 60 and 62 to permit selective control of the lift truck functions. One of the four switches triggers the controller 80 to supply current to a horn relay 92 to sound a horn of the lift truck. Details of the joystick and the selective functions will be discussed below with reference to FIGS. 4–7. The controller 80 also coordinates the electrical power distribution from the one battery source 84 to the traction motor 86 and the pump motor 12. If the battery voltage is low and inadequate power remains to meet the demand of both motors, for example, the controller 80 will reduce the supply of electric power to the pump motor 12 while maintaining the power supply to the traction motor 86 to permit the lift truck to be moved to charging station, for example.

Figure 2:
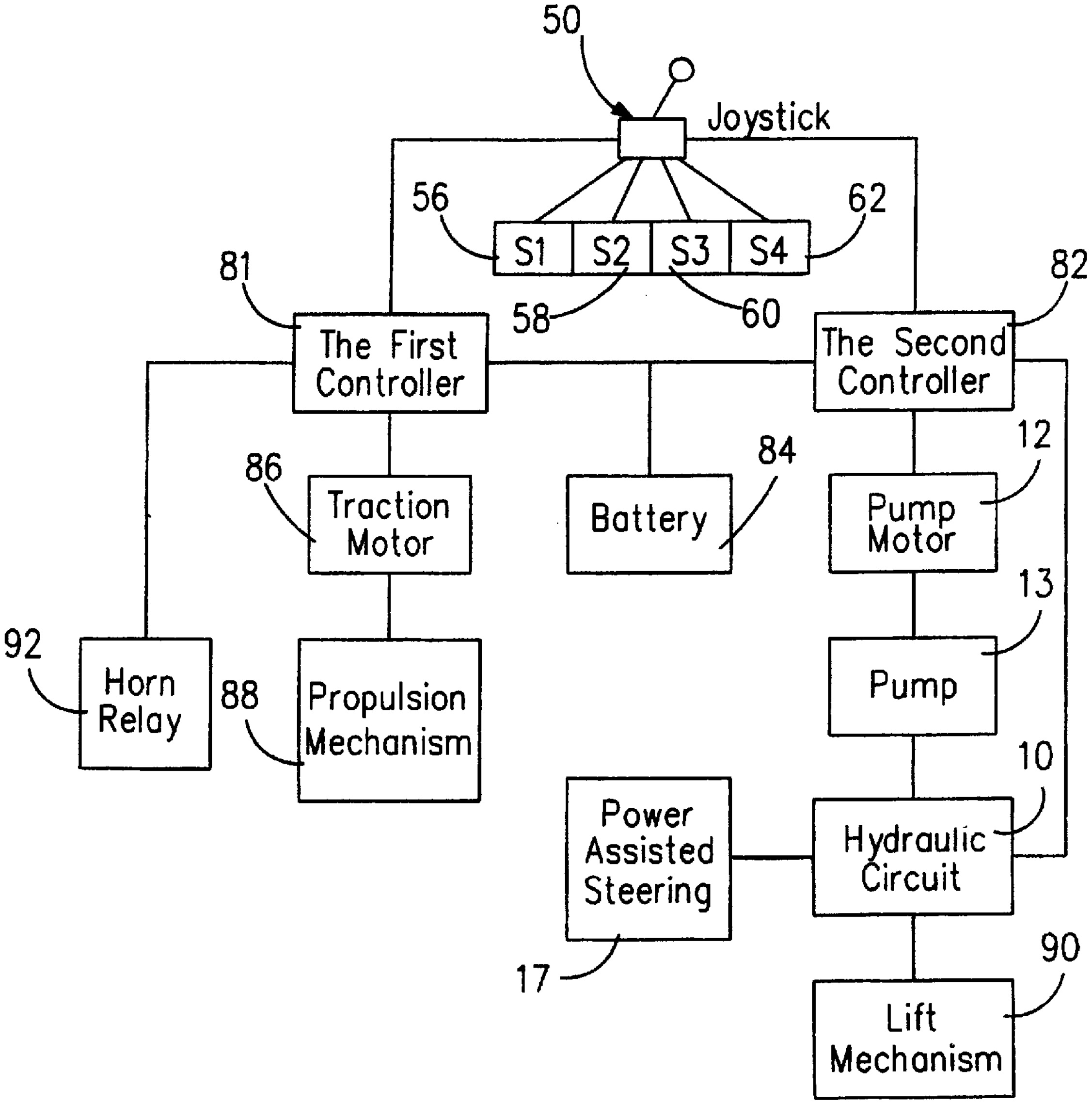
FIG. 2 is a schematic diagram of another embodiment of the present invention, in which two controllers are used, each controller controlling one of the motors shown in FIG. 1.

A second embodiment of the invention is illustrated in FIG. 2. The second embodiment is similar to the system shown in FIG. 1, except that two controllers 81 and 82 rather than the single controller 80 shown in FIG. 1 control the traction motor and the pump motor. The first controller 81 is connected to the traction motor 86 and the battery 84, and provides pulse width modulated DC or AC current from the battery 84 to the traction motor 86. The joystick 50 and the switches 56 through 62 are electrically connected to the two respective controllers 81 and 82. The first controller 81 is also connected to the horn relay 92. The second controller 82 is connected to the pump motor 12 and the battery 84, and provides pulse width modulated DC or AC current from the battery 84 to the pump motor 12. The pump motor 12 is connected to the pump 13 as shown in FIG. 2. The pump 13 is connected to the hydraulic circuit 10 through which pressurized hydraulic fluid is supplied to the power assisted steering 17 and the lift mechanism 90 of the lift truck. The first controller 81 is also linked to the second controller 82 so that the two controllers communicate with each other to control electric power distribution from the shared battery source 84 to the traction motor 86 and the pump motor 12. The first and second controllers 81 and 82 are preferably mounted in a single housing, to provide a compact structure which requires minimal cabling.

The controller 80 shown in FIG. 1 and the second controller 82 shown in FIG. 2 are connected to electrical components of the hydraulic circuit 10. This enables the controller to control a plurality of solenoid operated fluid valves including a variable proportional hydraulic cartridge for selective hydraulic functions. It also enables the controller to obtain feed-back signals from at least one sensor in the hydraulic circuit 10 to effect the control of the speed of revolution of the pump motor 12. Therefore, a fully proportional control for all the hydraulic functions of the lift truck is provided. The combination of motor speed control and variable proportional hydraulic control provides the desired hydraulic functions with the volume and pressure of hydraulic fluid required for a particular operation. The hydraulic pump 12 is controlled to run at idle speed whenever the lift truck is on if the lift truck is equipped with power assisted steering. The hydraulic pump motor speed is increased as required by demand for pressurized hydraulic fluid and returned to idle speed when the pressurized hydraulic fluid is no longer required. This avoids the wear caused by frequent starting from a dead stop under load. If the lift truck is not equipped with power assisted steering, the hydraulic pump is preferably turned off between lift function demands. When the frequent demands for pressurized hydraulic fluid imposed by power assisted steering are removed, it is more efficient to stop the hydraulic pump when there is no demand for lift functions. Details of the hydraulic circuit 10 and its connection to the controller 80 are described below in more detail.

Figure 3:
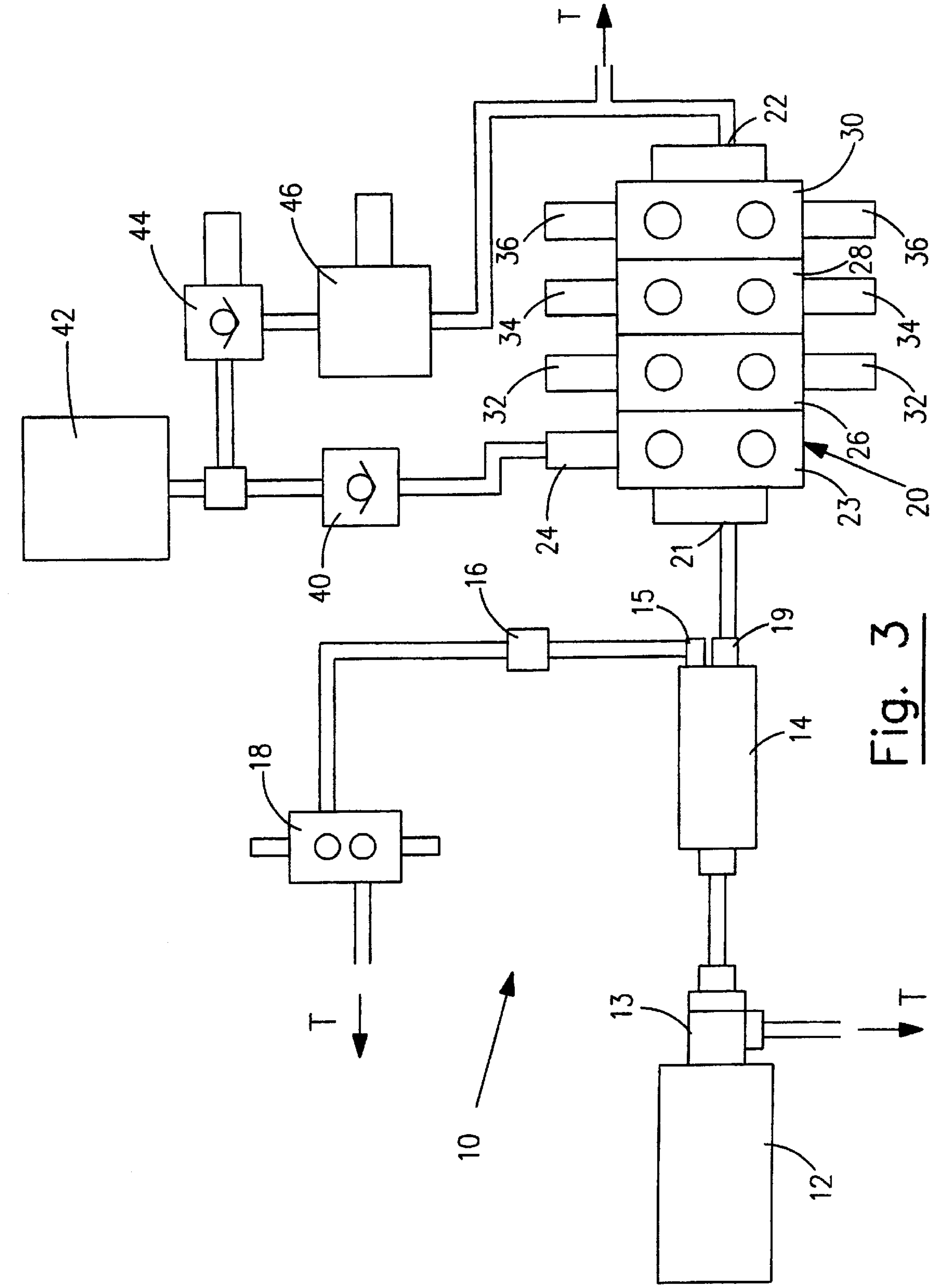
FIG. 3 is a schematic diagram of the hydraulic circuit used in the preferred embodiment of the present invention.

As illustrated in FIG. 3, a hydraulic circuit, generally indicated by reference 10, is used with the control system in the embodiment shown in FIG. 1. The pump 13 which is driven by the pump motor 12 is in fluid communication with a reservoir tank indicated by an arrow T, and a priority valve 14. A high priority port 15 of the priority valve 14 is connected to an "on demand" pressure switch 16 and a torque generator 18 which generates torque using the pressurized fluid for power assisted steering. A low priority port 19 of the priority valve 14 communicates with a valve block 20 through an inlet 21. The valve block 20, is connected through an outlet 22 to the tank as indicated by the arrow T. The valve block 20 includes a lift valve 23 which is actuated by a solenoid 24, tilt valves 26, reach valve 28 and a side-shift valve 30 which are actuated, respectively, by the solenoids 32, 34 and 36. The lift valve 23 communicates with a lift cylinder 42 through a check valve 40 which is a one-way valve that permits the fluid to flow from the lift valve 23 to the lift cylinder 42, but not in reverse. The lift cylinder 42 is a single acting cylinder for raising and lowering the lift mechanism. The check valve 40 ensures that the pressurized fluid only passes through to the lift cylinder and no fluid returns in order to prevent the lift mechanism from lowering if the supply of pressurized fluid is interrupted. A solenoid check valve 44 is provided between the lift cylinder 42 and a proportional valve 46 which is in fluid communication with the reservoir tank. The solenoid check valve 44 is opened to drain fluid from the lift cylinder under a pressure induced by the weight of the lift mechanism. The proportional valve 46 controls the rate of the fluid flow from the lift cylinder to enable controlled lowering of the lift mechanism.

A double-acting cylinder (not shown) or two single-acting cylinders (not shown) are connected to the tilt valves 26 for controlling up and down tilt of the lift mechanism. Similarly, reach valves 28 control a cylinder(s) for moving the lift mechanism toward and away from a front of the lift truck, which is referred to as "reach". A side-shift cylinder(s) controlled by valves 30 move the lift mechanism left and right with respect to the front of the lift truck.

The "on demand" pressure switch 16 in the hydraulic circuit 10 is electrically connected to the controller 80. The on-demand pressure switch generates an electrical signal detected by the controller 80 when the "on demand" pressure switch 16 senses a rise in the pressure of the pressurized hydraulic fluid. The solenoids 24, 32, 34 and 36 are electrically connected to the controller 80 and actuated by signals from the controller 80, respectively. Also electrically connected to the controller 80, are the solenoid check valve 44 and the proportional valve 46. The solenoid check valve 44 is actuated by a current switched by the controller 80 and the proportional valve 46 varies a fluid flow rate therethrough in response to a current switched by the controller.

Figure 5:
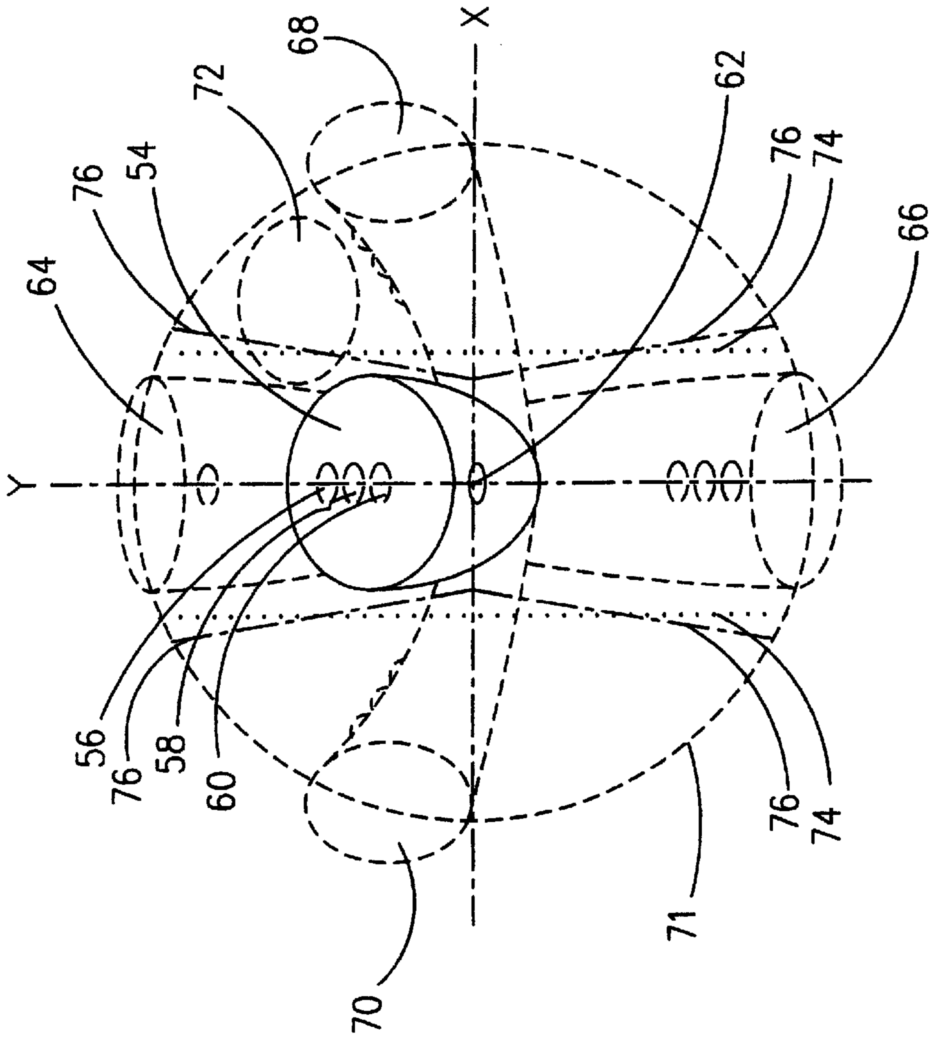
FIG. 5 is a schematic plan view of the joystick shown in FIG. 4, illustrating operational positions thereof.
Figure 4:
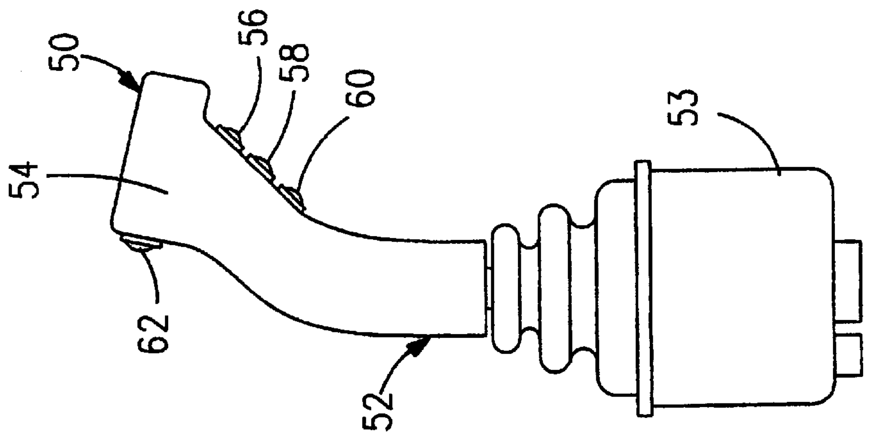
FIG. 4 is a side view of a joystick assembly of the present invention.

A first joystick assembly 50, illustrated in FIG. 4, is used as an operator interface to control propulsion of the lift truck and the lift mechanism of the truck. The joystick assembly 50 includes a joystick 52 operably mounted to a base housing 53. The joystick 52 has a top end 54 and a grip beneath the top end 54. Button switches 56, 58 and 60 are provided on one side of the grip to permit the operator to select one of lifting and lowering, tilt, reach and side-shift functions. The function of each button switch is mapped in the controller in accordance with a preferred arrangement of the functions. A button switch 62 is mounted to the other side of the grip. The button switch 62 is typically used for sounding a horn (not illustrated) mounted to the vehicle. The joystick normally rests in a vertical orientation as shown in FIG. 4 and FIG. 5. The top end 54 of the joystick is movable simultaneously along a first (Y) axis and a second (X) axis which are at right angles to each other as shown in FIG. 5. The base housing 53 contains an electrical signal generating device which is not shown because it is well known in the art. The electrical signal generating device is electrically connected to the controller 80 and is able to output different signals to the controller 80 in response to the different positions of the joystick 52 and the button switches 56, 58 and 60.

FIG. 5 shows some of the different positions of the joystick. The positions 64, 66, 68 and 70 shown in broken lines indicate the extremities of travel of the top end 54 of the joystick 52 as it is moved along the Y and X axis. The top end 54 of the joystick can be moved to any position within the circular line 71, one potential position being indicated by the reference 72, for example. Tilting the top end 54 of the joystick 52 forward along the y axis drives the lift truck in a forward direction, the speed of the lift truck depending on the extent of forward tilt of the joystick 52. Tilting the joystick rearward drives the lift truck in a rearward direction, the speed of rearward movement depending on the extent to which the joystick 52 is tilted rearwardly.

Vertical movement of the lift mechanism is controlled by tilting the joystick to either side of the Y axis. Tilting the joystick to the right raises the lift mechanism while tilting the joystick to the left lowers the lift mechanism. The three button switches 56, 58 and 60 are preferably placed in alignment on one side of the grip portion of the joystick to permit the operator to tilt the lift mechanism up or down, to move the lift mechanism toward and away from a front of the lift truck, or to move the lift mechanism left or right with respect to the front of the lift truck. The selection of one of the button switches overrides vertical movement of the lift mechanism. All operations of the lift mechanism are controlled in the same way as the truck speed is controlled in that the farther the joystick is tilted in a sideways direction along the X axis, the faster the lift mechanism responds to a selected function. When the joystick is in positions 64 and 66, the traction motor is operated at a programmed top speed. When the joystick 52 is in position 68, the pump motor is operated at a top selected speed for each function. However, when the joystick is positioned to the left of the Y axis, the controller 80 responds only to signals from the on-demand pressure switch 16 to control the speed of the hydraulic pump motor 12 because the lowering of the lift mechanism 90 does not require a supply of pressurized hydraulic fluid. The speed at which the lift mechanism 90 is lowered depends on the rate at which fluid drains from the lift cylinder 42, which is controlled by the proportional valve 46. If, however, one of the button switches 56, 58 or 60 is selected and the joystick 52 is tilted to the left of the Y axis, the controller 80 responds to the position of the joystick to control the speed of the hydraulic pump motor. This is more fully explained below with reference to the operation of the system.

The joystick 52 may be moved to the position 72, for example, as illustrated in FIG. 5 in which the position of joystick 52 simultaneously controls both the truck movement and the movement of the lift mechanism.

It is well understood that the structure of the human wrist tends to cause a certain side tilt in a joystick as it is tilted forwards and backwards along the Y axis. Consequently, a threshold area may be set within the controller so that a certain degree of side tilt is ignored in order to avoid accidental activation of lift functions as lift truck propulsion is controlled. The dotted parallel lines 74 shown in FIG. 5 indicate a threshold area set for this purpose. When the top end 54 of the joystick 52 is moved along the Y axis, any tilting away from the Y axis that is within the threshold area defined by the two parallel lines 74 is by the controller and no lift mechanism response is generated. In order to further ensure that unintentional movement of the lift mechanism is avoided, the threshold area may be mapped to individual preference, or the like. For example, as shown by the dotted and dashed lines 76 of FIG. 5, a proportional threshold area may be set for the first motor control. The threshold area defined by lines 76 increases in width as it extends farther away from the X axis. This renders the joystick less sensitive to side tilt to avoid unwanted lift function while the lift truck is driven at a high speed.

Figure 6:
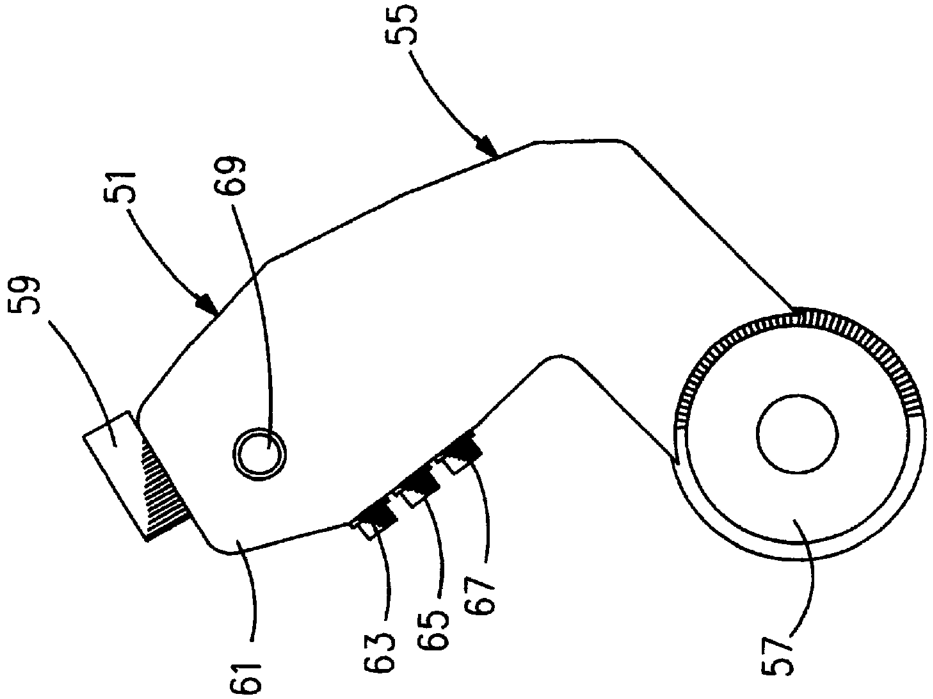
FIG. 6 is a side view of another embodiment of a joystick assembly of the invention.

Another embodiment of a joystick assembly 51 is illustrated in FIG. 6. The joystick assembly includes a joystick 55 and a base portion 57 which is operably connected to a signal generating device (not shown). A thumb wheel 59 is mounted to a top end 61 of the joystick 55. The thumb wheel 59 is rotatable around an axis that is perpendicular to the thumb wheel 59. Three button switches 63, 65 and 67 are provided on a front of the top end 61 to permit selection of different hydraulic functions. A button switch 69 is provided on the left side of the top end 61 of the joystick 55 for sounding a horn. As explained above, any of the button switches 63, 65, 67 and 69 may be mapped to any one of the functions.

Figure 7:
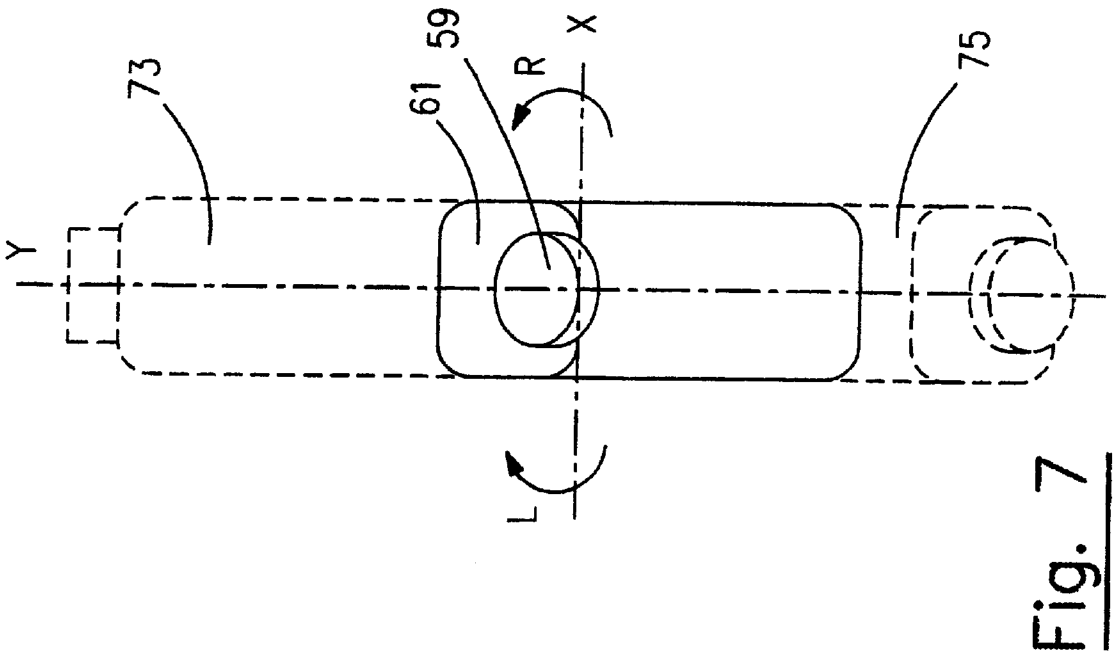
FIG. 7 is a schematic plan view of a joystick shown in FIG. 6, illustrating operational positions thereof.

As illustrated in FIG. 7, the joystick 55 is moveable along the Y axis to control the speed and direction of revolution of the traction motor 86, similar to the joystick shown in FIG. 4 and FIG. 5. The positions 73 and 75 are the extremities of travel for the joystick 55. In positions 73 and 75, the lift truck is driven at a pre-selected top speed. The joystick is not tiltable along the X axis. Rather, rotation of the thumb wheel 59 in either direction indicated by arrows L and R controls the speed of the second electric motor 12 and the direction of movement of the lift mechanism 90. The selection of bottom switches 63, 65 and 67 enable the operator to select the hydraulic functions of the lift mechanism, in the same way as described above with reference to FIGS. 4 and 5.

In operation, the operator controls drive speed and direction of the lift truck as well as the position of the hydraulic lift mechanism with one hand using the joystick 51, 52 while steering with the other hand. If the operator moves the joystick 51, 52 directly along the Y axis, he/she controls only the speed and direction of the lift truck. Likewise, manipulation of the joystick by the operator to generate signals to represent movement along the X axis controls only the lift functions. However, the operator may simultaneously control propulsion of the lift truck and the lift functions. For example, the operator may move the joystick to any position within the area defined by the circle 71 in FIG. 5. When the operator moves the joystick to the position 72, for example, the lift truck is driven forward at a moderate speed while the lift mechanism is also raised at a moderate speed. With the joystick in the position 72, if the operator wants to tilt the lift mechanism forward, extend the reach of the lift mechanism or to shift the implement to the right, instead of raising the lift mechanism, the operator presses one of the appropriate button switches 56, 58 or 60. If he/she wants to sound the horn, the operator can press the button switch 62. All signals generated by the joystick and button switches are received by the controller (see FIG. 1). In response to the signals received from the joystick, the controller supplies pulse width modulated DC or AC current from the battery to the propulsion motor and the pump motor. The controller also reverses the direction of rotation of the traction motor as commanded by the position of the joystick with respect to the Y axis.

The invention therefore provides a controller for the hydraulic pump motor which drives the hydraulic pump only on demand and in direct relation to command signals so that hydraulic functions are controlled by direct control of the pump motor as well as by incremental opening of the control valves. With this arrangement, the pump motor is idled at about 10% capacity while the lift truck is on and there is no demand for pressurized hydraulic fluid for the lift mechanism or for the power-assisted steering. This permits the realization of significant energy savings and contributes to battery life. This also prevents the damage caused by starting the pump motor and the pump under load and therefore reduces heat in the hydraulics and wear and tear on the components.

The pressurized fluid is pumped from the tank (indicated by the arrow T in FIG. 3) to the priority valve 14. The pressurized fluid from the pump is routed through the high priority port 15 to the torque generator 18 for the power assisted steering. Excess fluid passes through the low priority port 19 to be used for other hydraulic functions. When the lift truck is moving in a straight line or stops and no pressurized fluid is required for the power-assisted steering, the torque generator is in a neutral position and the pressurized fluid exits from the torque generator 18 to the tank. When the operator turns the steering wheel, the torque generator 18 is moved away from its neutral position and causes a rise in pressure of the pressurized fluid . The on-demand pressure switch 16 senses the rise in pressure of the pressurized fluid and generates a signal detected by the controller. The controller responds to the signal by increasing the pulse width of the drive controller which causes the pump motor to run faster and more pressurized fluid is therefore supplied through the priority valve 14 to the torque generator 18.

In response to the signals generated by a selection of a button switch 56, 58 or 60, the controller actuates one of the solenoids 32, 34 or 36 to open one of the valves 26, 28 or 30. Concurrently, the controller adjusts the pulse width of the drive controller to control the pump motor speed to ensure that the pump produces the required volume of pressurized fluid in response to the position of the joystick which determines motor speed. The pressurized fluid required for the hydraulic functions of the lift mechanism flows from the low priority port 19 of priority valve 14 to the inlet 21 of the valve block 20. When the joystick is placed in a position to the right of the Y axis (position 72, FIG. 5) or the thumb wheel 59 is rotated right (FIG. 7) and the lift function is selected, the pressurized fluid flows through the one-way check valve 40 and into the lift cylinder 42. The solenoid check valve 44 is closed during the lift function to ensure all pressurized fluid flowing through valve 23 is trapped in the lift cylinder 42. When the operator moves the joystick to the position 70 (FIG. 5) to lower the lift mechanism, the controller opens the solenoid check valve 44 and the proportional valve 46 to permit the hydraulic fluid to drain from the lift cylinder 42. In position 70, the proportional valve 46 is open to a pre-selected maximum because the top of the joystick is positioned at the extremity of its travel to the left so that the lift mechanism is lowered at the fastest speed. If the joystick is moved from the position 70 to its vertical orientation, shown as a solid line in FIG. 5, the proportional valve 46 is moved from a fully opened position to a fully closed position. When the joystick is placed in any position between the position 70 and the vertical orientation position, the proportional valve 46 is accordingly positioned between the fully opened and the fully closed positions. Pressurized fluid which enters the valve block 20 that is not required for the lift cylinder 42, passes through the valve block 20 and exits from the outlet 22 to the tank.

It will be understood by those skilled in the art that the hydraulic lift/power steering assist circuits in accordance with the invention are in no way limited to use with electric lift trucks and can also be profitably installed on trucks equipped with internal combustion engines.

We claim:

1. A control system for an electric lift truck, the electric lift truck including a first electric motor for truck propulsion and a second electric motor connected to a hydraulic pump for supplying pressurized hydraulic fluid through a hydraulic circuit to a hydraulic lift mechanism, comprising:

an interface for providing an integrated drive and hydraulic control system to permit an operator to control the propulsion of the electric lift truck and a plurality of functions of the hydraulic lift mechanism, the interface generating a plurality of electronic control signals in response to inputs through the interface by the operator;

an electronic controller connected to the interface and the first and second electric motors for receiving the electronic control signals from the interface, and controlling a speed and a direction of revolution of the first electric motor, and a speed of revolution of the second electric motor in direct relation to the electronic control signals so that hydraulic functions are controlled by direct control of the second motor as well as incremental opening of control valves in response to the electronic control signals.

2. A control system as claimed in claim 1 wherein the controller is a pulse-width modulation controller and the first and second electric motors are DC or AC motors.

3. A control system as claimed in claim 1 wherein the hydraulic circuit further comprises a power assisted steering system to which a hydraulic fluid is supplied with high priority from the pump.

4. A control system as claimed in claim 3 further comprising an on-demand pressure switch that is connected to the hydraulic circuit between the hydraulic pump and the power assisted steering system so that the on-demand pressure switch is triggered by a pressure rise in a supply of hydraulic fluid for the power assisted steering system, the on-demand pressure switch generating an electric signal to prompt the controller to change a speed of revolution of the second electric motor from a first speed to a second speed which is faster than the first speed.

5. A control system as claimed in claim 4 wherein the controller executes an algorithm for measuring electric signals from the on-demand pressure switch and the interface respectively, and controls the speed of revolution of the second electric motor in response to the signals so that the hydraulic pump meets a demand of both of the power assisted steering system and the hydraulic lift mechanism.

6. A control system as claimed in claim 5 wherein the controller controls the second electric motor to operate at an idle when no hydraulic fluid pressure is required for the hydraulic functions of the lift mechanism or the power assisted steering system.

7. A control system as claimed in claim 6 wherein the functions of the hydraulic lift mechanism are enabled by:

a lift cylinder for lifting and lowering the lift mechanism;

a tilt cylinder for tilting the lift mechanism;

a reach cylinder for moving the lift mechanism toward and away from a front of the lift truck;

a side-shift cylinder for moving the lift mechanism left and right with respect to the front of the lift truck; and a solenoid-valve block for selectively communicating the fluid pressure from the pump to the lift, tilt, reach or side-shift cylinder.

8. A control system as claimed in claim 1 wherein the power assisted steering system comprises:

a torque generator;

a priority valve with a low priority to the hydraulic lift mechanism to ensure that an operative volume of hydraulic fluid is delivered to the torque generator at all times.

9. A control system as claimed in claim 1 wherein the interface comprises a joystick enabled to generate signals simultaneously representative of movement with respect to a first axis and a second axis so that the speed and direction of revolution of the first electric motor is controlled by the signals representing movement with respect to the first axis and the functions of the hydraulic lift mechanism are simultaneously controlled by the signals representing movement with respect to the second axis.

10. A control system as claimed in claim 9 wherein the joystick further comprises a plurality of buttons for selecting hydraulic function options so that a control function of the joystick is selectable.

11. A control system as claimed in claim 10 wherein the plurality of buttons comprise a first, a second and a third button connected to the controller and the buttons are mapped to lift functions so that a tilt cylinder, a reach cylinder, a side-shift cylinder or a lift cylinder is controlled when the signals representative of movement with respect to the second axis are detected by the controller, the cylinder being controlled depending on lift function mapping and button selection.

12. A control system as claimed in claim 11 further comprising a proportional valve and a solenoid check valve connected in series between the lift cylinder and a tank for the hydraulic fluid, the solenoid check valve and proportional valve being controlled by an electric current switched by the controller so that when the signals representative of movement with respect to the second axis instruct the controller to lower the lift mechanism, a lowering speed of the lift mechanism is controlled.

13. A control system as claimed in claim 11 wherein the plurality of buttons further include an additional button connected to the controller, and the controller switches battery current to energize a horn relay to sound a horn when the additional button is pressed.

14. A control system as claimed in claim 12 wherein the controller responds to the joystick so that the speed of revolution of the first and the second electric motors increases when the signals representative of movement with respect to the first and the second axes respectively are detected by the controller, except in a lift mechanism lowering operation, and the direction of revolution of the first electric motor is changed when the top end of the joystick is tilted from a vertical orientation in opposite directions along the first axis and the direction of a movement of a lift mechanism function is changed when the signals representing movement in opposite directions with respect to the second axis.

15. A control system as claimed in claim 7 further comprising a check valve between the solenoid-valve block and the lift cylinder to prevent the lift mechanism from falling if a supply of hydraulic fluid is interrupted.

16. A control system as claimed in claim 1 wherein the control system includes a first controller and a second controller, the first controller controlling the first motor and the second controller controlling the second motor and lift functions of the electric lift truck.

17. A control system as claimed in claim 16 wherein the interface comprises a joystick enabled to generate signals simultaneously representative of movement with respect to a first and a second axis, the joystick being connected to the first and second controllers so that the speed and direction of the first electric motor is controlled in response to the signals representative of movement with respect to the first axis, and the functions of the hydraulic lift mechanism are controlled by signals representative of movement with respect to the second axis.

18. A control system as claimed in claim 16 wherein the interface comprises a joystick having a top end movable along the first axis and a thumb wheel rotatably mounted to a top end of the joystick and rotatable with respect to the second axis, the joystick being connected to the first and second controllers so that the speed and direction of the first electric motor is controlled when the top end of the joystick is moved along the first axis, and the functions of the hydraulic lift mechanism are controlled by a rotation of the thumb wheel with respect to the second axis.

19. A control system as claimed in claim 18 wherein the joystick further comprises a plurality of buttons for hydraulic function options so that a control function of the joystick is user selectable and the controller executes the control function when the thumb wheel is rotated and the function changes when one of the buttons is pressed.

20. An electronically controlled hydraulic system for a lift truck having a power assisted steering and a hydraulic lift mechanism, comprising:

a pump driven by an electric motor for supplying pressurized hydraulic fluid to a torque generator for the power assisted steering and to the hydraulic lift mechanism;

a hydraulic circuit including a reservoir for the hydraulic fluid and a priority valve, the hydraulic circuit being in fluid communication with the pump and torque generator as well as the hydraulic lift mechanism, the priority valve distributing a fluid flow to the torque generator with a high priority so that a required supply of the pressurized fluid to the torque generator is ensured;

an on-demand pressure switch connected to the hydraulic circuit, the on-demand pressure switch being triggered and generating an electric signal when the torque generator causes a rise in the hydraulic fluid pressure;

an interface for an operator to control a plurality of functions of the hydraulic lift mechanism, the interface generating a plurality of control signals in response to manipulation of the interface by the operator;

a controller for controlling the motor, the controller being connected to the on-demand pressure switch and the interface so that when the controller receives a signal from the on-demand pressure switch or a signal from the interface, the controller changes a speed of revolution of the motor, but the controller operates the motor at an idle speed when the power assisted steering and the lift mechanism are each in a standby state and a supply of pressurized hydraulic fluid is not required.

21. An electronically controlled hydraulic system as claimed in claim 20 wherein the controller is pulse-width modulation controller and the motor is a DC or AC motor.

22. An electronically controlled hydraulic system as claimed in claim 21 wherein the hydraulic circuit comprises:

a lift cylinder for lifting and lowering the lift mechanism;

a tilt cylinder for tilting the lift mechanism;

a reach cylinder for moving the lift mechanism toward and away from a front of the lift truck;

a side-shift cylinder for moving the lift mechanism left and right with respect to the front of the lift truck; and a solenoid-valve block for selectively directing the pressurized fluid from the pump to a one of the lift, tilt, reach and side-shift cylinders.

23. An electrically controlled hydraulic system as claimed in claim 22 wherein the hydraulic circuit further comprises a proportional valve and a solenoid check valve connected in series between the lift cylinder and the tank, the solenoid check valve and proportional valve being controlled by the controller so that a lowering speed of the lift mechanism is controlled.

24. An electrically controlled hydraulic system as claimed in claim 23 wherein the hydraulic circuit further comprises a check valve connected between the solenoid-valve block and the lift cylinder for preventing the lift mechanism from falling in case of an interruption in the supply of pressurized hydraulic fluid.

25. An operator interface for providing an integrated drive and hydraulic control system to permit the operator to control an electric lift truck, the electric lift truck including a first electric motor for truck propulsion and a second electric motor connected in driving relation to a hydraulic pump, comprising:

a joystick enabled to generate electric signals simultaneously representative of movement with respect to a first and second axis;

an electric controller for controlling a speed and direction of revolution of the first electric motor and a speed of revolution of the second electric motor respectively, the controller receiving the electric signals generated by the joystick when the operator manipulates the joystick to generate electric signals representative of movement along the first and second axes, and controls a speed and a direction of revolution of the first electric motor in response to electric signals representative of movement with respect to the first axis and controls a speed of revolution of the second electric motor in response to electric signals representative of movement with respect to the second axis so that hydraulic functions are controlled by direct control of the second motor as well as incremental opening of control valves in response to the electronic control signals.

26. An operator interface as claimed in claim 25 wherein the first axis and second axes are at right angles to each other, and the joystick is tiltable along the first and second axes by the operator of the lift truck.

27. An operator interface as claimed in claim 25 wherein a thumb wheel is mounted to a top end of the joystick, the thumb wheel being rotatable with respect to the second axis and the joystick is tiltable along the fist axis.

28. An operator interface as claimed in claim 26 wherein the direction of revolution of the first electric motor is changed when the joystick is tilted along the first axis and past a vertical orientation and a direction of a movement of a lift mechanism is changed when the joystick is moved along the second axis and past the vertical orientation.

29. An operator interface as claimed in claim 25 wherein the joystick further comprises a plurality of buttons which may be pressed to control a plurality of functions of the hydraulic lift mechanism, in addition to a default function which is operative when none of the buttons are pressed.

30. An operator interface as claimed in claim 29 wherein the signals representing movement of the joystick with respect to the second axis causes the controller to actuate a solenoid check valve and a proportional valve in a hydraulic circuit to lower an hydraulic lift mechanism of the electric lift truck when a lowering option is selected.

31. An operator interface as claimed in claim 29 wherein the plurality of buttons are mapped to control a tilt option, a reach option, a side-shift option, and a horn.

32. An operator interface as claimed in claim 25 wherein the lift truck is equipped with power steering and the controller generates a signal to cause the second electric motor to operate at an idle speed when the joystick is in a vertical orientation or the joystick is manipulated to generate signals for selecting a function for lowering the hydraulic lift mechanism.

33. An operator interface as claimed in claim 26 wherein threshold areas are mapped on each side of the first axis and signals generated by the joystick when the joystick is tilted along the second axis within the threshold areas are ignored by the controller so that the slight tilting of the joystick to one side as the joystick is tilted along the first axis to control a lift truck propulsion does not activate a lift function.

34. An operator interface as claimed in claim 33 wherein a width of the threshold areas are proportional to the tilt of the joystick along the first axis so that the width of the threshold areas increases as a speed of the vehicle increases.

* * * * *